(12) United States Patent
Rose

(10) Patent No.: US 10,486,255 B2
(45) Date of Patent: Nov. 26, 2019

(54) METHOD OF SHORT CIRCUIT PULSE METAL INERT GAS WELDING

(71) Applicant: United Technologies Corporation, Hartford, CT (US)

(72) Inventor: William M. Rose, Warren, MA (US)

(73) Assignee: United Technologies Corporation, Farmington, CT (US)

( * ) Notice: Subject to any disclaimer, the term of this patent is extended or adjusted under 35 U.S.C. 154(b) by 684 days.

(21) Appl. No.: 14/770,698

(22) PCT Filed: Feb. 25, 2014

(86) PCT No.: PCT/US2014/018327
§ 371 (c)(1),
(2) Date: Aug. 26, 2015

(87) PCT Pub. No.: WO2014/134041
PCT Pub. Date: Sep. 4, 2014

(65) Prior Publication Data
US 2016/0001390 A1    Jan. 7, 2016

Related U.S. Application Data

(60) Provisional application No. 61/770,720, filed on Feb. 28, 2013.

(51) Int. Cl.
| | |
|---|---|
| B23K 9/04 | (2006.01) |
| B23K 9/00 | (2006.01) |
| B23K 9/173 | (2006.01) |
| B23K 9/23 | (2006.01) |
| B23K 9/235 | (2006.01) |
| F01D 5/00 | (2006.01) |

(Continued)

(52) U.S. Cl.
CPC ............ *B23K 9/044* (2013.01); *B23K 9/0026* (2013.01); *B23K 9/09* (2013.01); *B23K 9/173* (2013.01); *B23K 9/23* (2013.01); *B23K 9/235* (2013.01); *B23K 35/3033* (2013.01); *B23K 35/325* (2013.01); *F01D 5/005* (2013.01); *B23K 2101/001* (2018.08); *B23K 2103/14* (2018.08); *B23K 2103/26* (2018.08); *B23P 6/007* (2013.01); *F05D 2230/235* (2013.01)

(58) Field of Classification Search
CPC .. B23K 9/044; B23K 35/3033; B23K 35/325; B23K 9/0026; B23K 9/09; B23K 9/173; B23K 9/23; B23K 9/235; B23K 2101/00; F05D 2230/235
See application file for complete search history.

(56) References Cited

U.S. PATENT DOCUMENTS

| | | | |
|---|---|---|---|
| 4,309,848 A | 1/1982 | Arrigoni | |
| 4,726,104 A | 2/1988 | Foster et al. | |

(Continued)

FOREIGN PATENT DOCUMENTS

| | | |
|---|---|---|
| JP | 2010094703 | 4/2010 |
| WO | 0024545 | 5/2000 |

OTHER PUBLICATIONS

Partial EP Search Report dated May 17, 2016.

*Primary Examiner* — Geoffrey S Evans
(74) *Attorney, Agent, or Firm* — O'Shea Getz P.C.

(57) ABSTRACT

A method for low heat welding includes providing short circuit pulse Metal Inert Gas (MIG) welding at less than a rate of about a twenty (20) inch a minute travel speed.

8 Claims, 2 Drawing Sheets

(51) Int. Cl.
  *B23K 35/30* (2006.01)
  *B23K 35/32* (2006.01)
  *B23K 9/09* (2006.01)
  *B23P 6/00* (2006.01)
  *B23K 101/00* (2006.01)
  *B23K 103/14* (2006.01)
  *B23K 103/18* (2006.01)

(56) References Cited

U.S. PATENT DOCUMENTS

| | | | |
|---|---|---|---|
| 5,106,010 A | | 4/1992 | Stueber et al. |
| 5,374,319 A | | 12/1994 | Stueber et al. |
| 5,545,873 A | | 8/1996 | Sauer |
| 5,822,852 A | | 10/1998 | Bewlay et al. |
| 5,824,991 A | | 10/1998 | Mita et al. |
| 6,077,615 A | | 6/2000 | Yada et al. |
| 6,179,567 B1 | * | 1/2001 | Stauffer .............. B23C 3/28 416/191 |
| 6,302,649 B1 | | 10/2001 | Mukira et al. |
| 6,326,585 B1 | | 12/2001 | Aleshin et al. |
| 6,332,272 B1 | | 12/2001 | Sinnott et al. |
| 6,333,484 B1 | | 12/2001 | Foster et al. |
| 6,354,799 B1 | | 3/2002 | Mukira et al. |
| 6,376,801 B1 | | 4/2002 | Farrell et al. |
| 6,392,194 B1 | | 5/2002 | Fortain et al. |
| 6,468,367 B1 | | 10/2002 | Mukira et al. |
| 6,489,584 B1 | | 12/2002 | Kelly |
| 6,565,680 B1 | | 5/2003 | Jackson et al. |
| 6,568,077 B1 | | 5/2003 | Hellemann et al. |
| 6,596,971 B1 | * | 7/2003 | Biskup .............. F28F 21/087 219/137 WM |
| 6,727,459 B1 | | 4/2004 | Bialach |
| 6,814,820 B2 | | 11/2004 | Ozbaysal |
| 6,991,150 B2 | | 1/2006 | Sato et al. |
| 6,994,920 B2 | | 2/2006 | Trewiler |
| 7,250,081 B2 | | 7/2007 | Hu et al. |
| 7,587,818 B2 | | 9/2009 | Gorman et al. |
| 7,797,828 B2 | | 9/2010 | Beeson et al. |
| 7,915,566 B2 | | 3/2011 | Arjakine et al. |
| 8,091,228 B2 | * | 1/2012 | Hiskes .............. B23P 6/005 29/889.1 |
| 2002/0036186 A1 | | 3/2002 | Fortain et al. |
| 2008/0263863 A1 | * | 10/2008 | Rose .............. B23K 10/027 29/889.1 |
| 2009/0241339 A1 | * | 10/2009 | Hasselberg .......... B23K 9/046 29/889.1 |
| 2009/0271984 A1 | * | 11/2009 | Hasselberg .......... B23K 9/044 29/889.1 |
| 2009/0274553 A1 | * | 11/2009 | Bunting .............. B23K 9/173 415/182.1 |
| 2010/0224609 A1 | * | 9/2010 | Rose .............. B23K 9/022 219/137 R |
| 2011/0049112 A1 | | 3/2011 | Johnson et al. |
| 2012/0171517 A1 | * | 7/2012 | Yuschak .............. B23K 1/0012 428/674 |
| 2013/0082446 A1 | * | 4/2013 | Pezzutti .............. B23K 9/048 277/412 |
| 2014/0131334 A1 | * | 5/2014 | Zhang .............. B23K 9/1093 219/137 R |
| 2014/0147283 A1 | * | 5/2014 | Ward, Jr. .............. F01D 5/005 416/189 |
| 2015/0129559 A1 | * | 5/2015 | Fairchild .............. B23K 35/308 219/73 |
| 2015/0251281 A1 | * | 9/2015 | Hebuterne .......... B23K 9/124 219/76.14 |

* cited by examiner

METHOD OF SHORT CIRCUIT PULSE METAL INERT GAS WELDING

This application claims priority to PCT Patent Application No. PCT/US14/18327 filed Feb. 25, 2014, which claims priority to U.S. Patent Appln. No. 61/770,720 filed Feb. 28, 2013.

BACKGROUND

The present disclosure relates generally to aerospace components used in gas turbine engines and more particularly to methods and apparatuses for application of a low heat weld.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Arranged within the compressor and turbine sections are alternating annular stages of circumferentially disposed rotational blades and stationary vanes. The blades are typically mounted on a disk that rotates about its central axis though integrally bladed rotors (IBR) and blades referred to as BLISKS in the industry may also be used. The blades and vanes are typically forged from superalloys such as a nickel-base alloy. In addition, the casting is frequently performed so as to produce a directionally solidified part with grains aligned parallel to the axis of the blade or a single crystal part, with no grain boundaries.

Some gas turbine engine blades are designed so that during engine operation, the tip portion of the rotating blades rubs a stationary seal or case to limit the leakage of working medium gases. While the seals are usually more abradable than are the blade tips—so that during such rub interactions, a groove is cut into the seal—the blade tips do wear, and the blades become shorter. As the blades accumulate service time, the total tip wear increases to the point that eventually, the efficiency of the blade and seal system may be reduced such that the blades need to be repaired or replaced. Repairs are typically more efficient.

Several methods exist for repair. The tips of worn blades can be repaired, and the length of the blade increased, by removal, or the worn and/or damaged tip area then weld filler metal is used to the tip to build up the tip to a desired dimension. Such weld filler repairs may import a significant quantity of heat into the component such that relatively thin components may only accept a limited build up of weld material which limits the length increase.

SUMMARY

A method for low heat welding according to one disclosed non-limiting embodiment of the present disclosure includes providing short circuit pulse Metal Inert Gas (MIG) welding at less than a rate of about a twenty (20) inch a minute travel speed.

A further embodiment of the present disclosure includes providing an about 100% argon shielding gas for the short circuit pulse Metal Inert Gas (MIG) welding.

A further embodiment of any of the foregoing embodiments of the present disclosure includes providing an about 99.75% argon and an about 0.25% carbon dioxide shielding gas for the short circuit pulse Metal Inert Gas (MIG) welding.

A further embodiment of any of the foregoing embodiments of the present disclosure includes providing short circuit pulse Metal Inert Gas (MIG) welding at a rate of 5-15 inch a minute travel speed.

A further embodiment of any of the foregoing embodiments of the present disclosure includes providing short circuit pulse Metal Inert Gas (MIG) welding at a rate of 5 inch a minute travel speed.

A method for repairing an aerospace component according to another disclosed non-limiting embodiment of the present disclosure includes removing material on an aerospace component to provide a consistent surface; and building-up material on the consistent surface via short circuit pulse Metal Inert Gas (MIG) welding at less than a rate of about a twenty (20) inch a minute travel speed to provide a weld buildup.

A further embodiment of any of the foregoing embodiments of the present disclosure includes machining the weld buildup to original nominal dimensions of the aerospace component.

A further embodiment of any of the foregoing embodiments of the present disclosure includes, wherein the aerospace component is a knife edge.

A further embodiment of any of the foregoing embodiments of the present disclosure includes providing an about 100% argon shielding gas for the short circuit pulse Metal Inert Gas (MIG) welding.

A further embodiment of any of the foregoing embodiments of the present disclosure includes providing an about 99.75% argon and an about 0.25% carbon dioxide shielding gas for the short circuit pulse Metal Inert Gas (MIG) welding.

A further embodiment of any of the foregoing embodiments of the present disclosure includes, wherein the aerospace component is manufactured of a Titanium based material.

A further embodiment of any of the foregoing embodiments of the present disclosure includes, wherein the aerospace component is manufactured of a Nickel based material.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
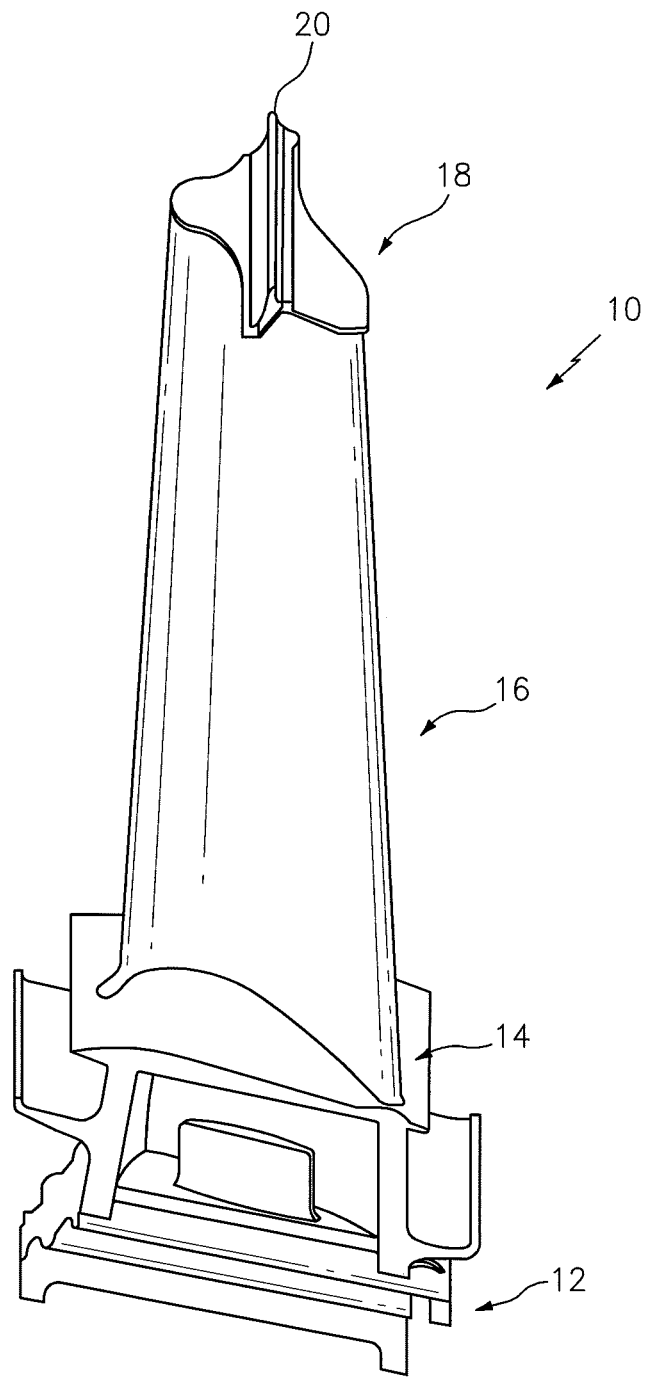
FIG. 1 is a perspective view of an aerospace component.

FIG. 1 schematically illustrates an aerospace component 10, that includes a root 12, a platform 14, an airfoil 16, and a tip shroud 18 with a knife edges 20. The component 10 may be, for example, a shrouded high pressure turbine blade, but is not limited thereto and may include vanes, blades, and other aerospace components.

The root 12 may be a dovetail or fir tree root and is configured for receipt in a slot in the rim of a rotor disc (not shown). The platform 14 is integral with and radially outboard of the root 12. The airfoil 16 extends radially outward from the platform 14 to the top shroud 18 that includes the knife edge 20 that is designed to engage, for example, a stationary honeycomb seal (not shown).

Through normal engine operation, the knife edges 20 may wear away over time. In order to extend the useful life of the blade 10, the knife edges 20 may be restored to the original manufactured condition. Although disclosed with respect to a knife edge 20, it should be understood that any component which requires a thin section weld such as for example, but not limited to, a squealer tip, combustor edge, combustor pin will also benefit herefrom.

A short circuit pulse Metal Inert Gas (MIG) welding system such as the Cold Metal Transfer and Cold Metal Transfer Print welding technology of Fronius International in Portage, Ind., USA uses short pulses along with a short circuit features to produce small deposits of weld. When the travel speed is manipulated to traverse relatively slow, the result is a very small weld made of continuous pulses of power and detachment of the weld material in small dots.

In one disclosed non-limiting embodiment, less than a twenty (20) inch a minute (508 mm/min) travel speed and in particular a five to fifteen (5-15) inch a minute (127-381 mm/min) travel speed is utilized with a Rene'142, PWA795 material weld wire and 100% argon or 99.75% argon and 0.25% carbon dioxide shielding gas. This relatively slow travel speed utilized has demonstrated effective low heat welds on various configurations and materials such as aerospace materials including but not limited to, Titanium alloys, Cobalt alloys and Nickel alloys.

Figure 2:
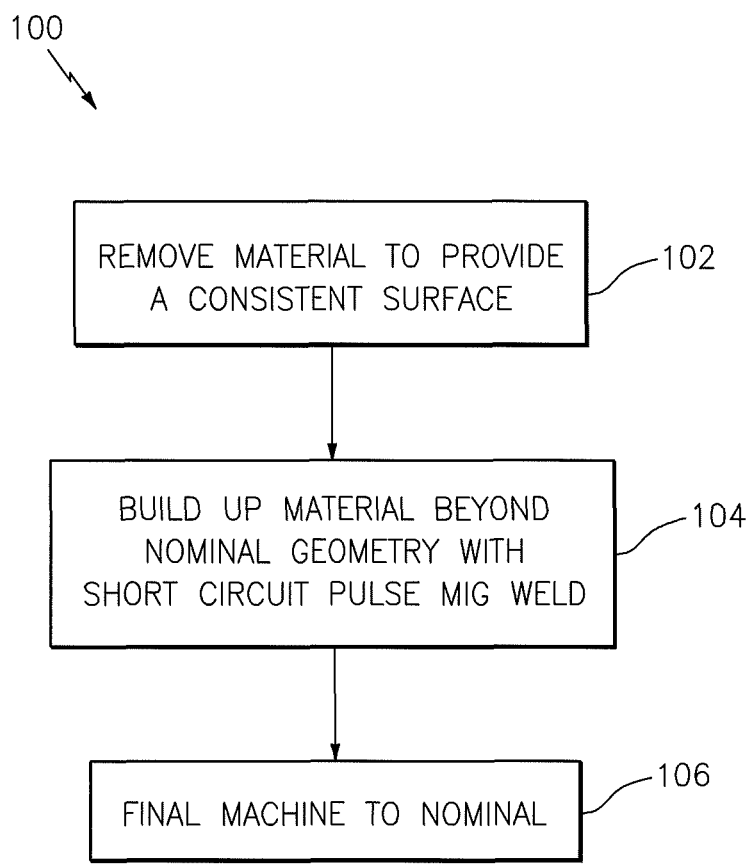
FIG. 2 is schematic block diagram of a method to repair the aerospace component

With reference to FIG. 2, one disclosed, non-limiting embodiment of a repair method 100 initially includes the removal of material to provide a consistent surface (step 102). The short circuit pulse MIG weld is then utilized to build-up material beyond a nominal geometry (step 104). The build-up material is then final machined to original nominal dimensions (step 106).

This short circuit pulse MIG weld has a very small heat affected zone due to the non-continuous nature of the process to facilitate an extension of limits when utilized to repair components such as the knife edges 20. For example, the extension of limits permits the repair of more components that, for example, have knife edges 20 that may previously be limited to 0.0001 inches (0.0025 mm) of wear from nominal. Now, due to the minimum heat input, knife edges 20 may be repaired with, for example, 0.0002 to 0.0004 inches (0.005-0.010 mm) of wear from nominal. It should be appreciated that this is but a single example and that other components with other extension of limits will also benefit herefrom, for example, integrally bladed rotors (IBR).

More precise repairs are facilitated due to the very small weld bead that is achievable with this method. Minimum heat input is required to perform this weld, so more sensitive materials can be repaired using this technology.

Repairs that employ embodiments of that disclosed herein therefore reduce repair time and cost, and simultaneously improve repair quality.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method for repairing an aerospace component comprising:
   removing material on an aerospace component to provide a consistent surface, the aerospace component comprising a turbine blade, wherein the turbine blade comprises a knife edge located at a tip of the turbine blade, and the knife edge is configured with the consistent surface; and
   building-up material on the consistent surface of the turbine blade via short circuit pulse Metal Inert Gas (MIG) welding at less than a rate of a twenty (20) inch a minute travel speed to provide a weld buildup.

2. The method as recited in claim 1, further comprising: machining the weld buildup to original nominal dimensions of the aerospace component.

3. The method as recited in claim 1, further comprising: providing a 100% argon shielding gas for the short circuit pulse Metal Inert Gas (MIG) welding.

4. The method as recited in claim 1, further comprising: providing a 99.75% argon and a 0.25% carbon dioxide shielding gas for the short circuit pulse Metal Inert Gas (MIG) welding.

5. The method as recited in claim 1, wherein the aerospace component is manufactured of a Titanium based material.

6. The method as recited in claim 1, wherein the aerospace component is manufactured of a Nickel based material.

7. The method as recited in claim 1, wherein the short circuit pulse Metal Inert Gas (MIG) welding comprises short circuit pulse Metal Inert Gas (MIG) welding at a rate of 5-15 inch a minute travel speed.

8. The method as recited in claim 1, wherein the short circuit pulse Metal Inert Gas (MIG) welding comprises short circuit pulse Metal Inert Gas (MIG) welding at a rate of 5 inch a minute travel speed.

* * * * *